US012655979B2

(12) United States Patent

Hu

(10) Patent No.: US 12,655,979 B2

(45) Date of Patent: Jun. 16, 2026

(54) HYDROGEN-DRIVEN GAS TURBINE ENGINE WITH INJECTOR RING AND FUEL STAGING

(71) Applicant: PRATT & WHITNEY CANADA CORP., Longueuil (CA)

(72) Inventor: Tin Cheung John Hu, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/426,454

(22) Filed: Jan. 30, 2024

(65) Prior Publication Data

US 2024/0263797 A1     Aug. 8, 2024

Related U.S. Application Data

(60) Provisional application No. 63/482,856, filed on Feb. 2, 2023.

(51) Int. Cl.
*F23R 3/28* (2006.01)
*F02C 7/22* (2006.01)

(52) U.S. Cl.
CPC .............. *F23R 3/286* (2013.01); *F02C 7/222* (2013.01); *F23R 3/283* (2013.01)

(58) Field of Classification Search
CPC .... F02C 3/20; F02C 3/22; F02C 7/222; F02C 9/40; F05D 2240/35; F23R 3/283; F23R 3/286; F23R 3/343
See application file for complete search history.

(56) References Cited

U.S. PATENT DOCUMENTS 5,590,529 A  *  1/1997  Joshi .................... F23D 14/02
                                                    60/737
6,161,387 A  *  12/2000  Green .................... F23R 3/14
                                                    60/742

(Continued)

FOREIGN PATENT DOCUMENTS

CN          115127123          9/2022
JP          7456554 B2  *  3/2024
(Continued)

OTHER PUBLICATIONS

European Search Report for European Patent Application No. 24154187.9 mailed May 14, 2024.

*Primary Examiner* — Devon C Kramer
*Assistant Examiner* — Henry Ng
(74) *Attorney, Agent, or Firm* — Carlson, Gaskey & Olds, P.C.

(57) ABSTRACT

A gas turbine engine includes an annular combustion chamber and an injector ring. The annular combustion chamber is disposed about an axis and has first and second axial ends and radially inner and outer walls. The injector ring is disposed about the axis at the first axial end and is configured to introduce a hydrogen and gas mixture into the combustion chamber. The injector ring includes gas feed conduits that open into a central mixing region, a hydrogen manifold cavity that has first and second isolated compartments, first hydrogen feed conduits that extend off of the first isolated compartment and open into the central mixing region, and second hydrogen feed conduits that extend off of the second isolated compartment and open into the central mixing region.

7 Claims, 3 Drawing Sheets

(56)     References Cited

U.S. PATENT DOCUMENTS

| | | | | |
|---|---|---|---|---|
| 9,746,185 | B2 | 8/2017 | Ritland et al. | |
| 12,007,117 | B1 * | 6/2024 | Boardman | F23R 3/286 |
| 12,038,177 | B1 * | 7/2024 | Kramer | F02C 3/30 |
| 2003/0010032 | A1 * | 1/2003 | Stuttaford | F23D 14/64 |
| | | | | 60/737 |
| 2006/0156734 | A1 * | 7/2006 | Bland | F23R 3/286 |
| | | | | 60/776 |
| 2009/0113893 | A1 * | 5/2009 | Li | F23R 3/14 |
| | | | | 60/737 |
| 2010/0248171 | A1 * | 9/2010 | Hayashi | F23R 3/286 |
| | | | | 431/196 |
| 2014/0075949 | A1 | 3/2014 | Prociw | |
| 2017/0074519 | A1 * | 3/2017 | Abe | F23R 3/10 |
| 2017/0211807 | A1 * | 7/2017 | Graichen | F23R 3/283 |
| 2018/0298824 | A1 * | 10/2018 | Matsuyama | F23R 3/343 |
| 2020/0025386 | A1 * | 1/2020 | Muldal | F23R 3/343 |
| 2020/0158020 | A1 | 5/2020 | Yagi et al. | |
| 2021/0010674 | A1 * | 1/2021 | Thariyan | F23R 3/14 |
| 2022/0082259 | A1 * | 3/2022 | Bourgois | F23R 3/283 |
| 2023/0194093 | A1 * | 6/2023 | Bucaro | F23R 3/36 |
| | | | | 60/737 |
| 2023/0213191 | A1 * | 7/2023 | Vukanti | F23R 3/04 |
| | | | | 60/752 |
| 2023/0417414 | A1 | 12/2023 | Ito et al. | |
| 2024/0263581 | A1 * | 8/2024 | McCaldon | F02C 7/222 |
| 2024/0263590 | A1 * | 8/2024 | Hu | F02C 3/20 |
| 2024/0263783 | A1 * | 8/2024 | Hu | F02C 7/22 |
| 2024/0263796 | A1 * | 8/2024 | Hu | F23R 3/286 |

FOREIGN PATENT DOCUMENTS

| | | |
|---|---|---|
| WO | 2018144008 | 8/2018 |
| WO | 2022202103 | 9/2022 |
| WO | 2022202104 | 9/2022 |

* cited by examiner

HYDROGEN-DRIVEN GAS TURBINE ENGINE WITH INJECTOR RING AND FUEL STAGING

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Present gas turbine engines use liquid hydrocarbon fuels (LHF). LHF is provided through a fuel supply system and introduced into the combustor by liquid injectors. The fuel supply system and liquid injectors are designed for handling and efficient burning of the LHF. For instance, as liquid is much denser than the air (gas) it is to be mixed with, it is necessary for the liquid injectors to atomize the LHF into tiny droplets in order to facilitate more uniform burning. More recently it has been proposed to utilize hydrogen ($H_2$) as a fuel.

SUMMARY

A gas turbine engine according to an example of the present disclosure includes an annular combustion chamber and an injector ring. The annular combustion chamber is disposed about an axis and has first and second axial ends and radially inner and outer walls. The injector ring is disposed about the axis at the first axial end and is configured to introduce a hydrogen and gas mixture into the combustion chamber. The injector ring includes gas feed conduits that open into a central mixing region, a hydrogen manifold cavity that has first and second isolated compartments, first hydrogen feed conduits that extend off of the first isolated compartment and open into the central mixing region, and second hydrogen feed conduits that extend off of the second isolated compartment and open into the central mixing region.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
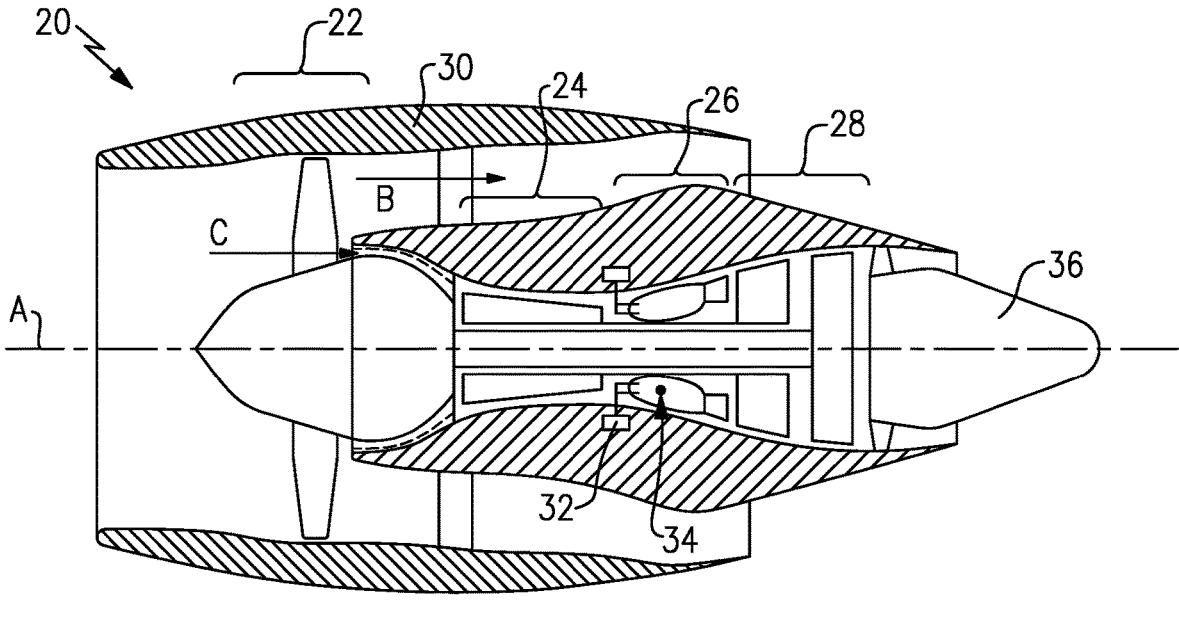
FIG. 1 illustrates a gas turbine engine.

FIG. 1 schematically illustrates a gas turbine engine 20. The example gas turbine engine 20 is a turbofan that generally incorporates a fan section 22, a compressor section 24, a combustor section 26, and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air or other combustion gas is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines, such as industrial gas turbine engines and propeller gas turbine engines where, rather than having the propulsor be an enclosed fan, the propulsor is an open propeller.

While present gas turbine engines use liquid hydrocarbon fuels (LHF), the engine 20 of the present disclosure is designed to use gaseous fuel, such as hydrogen, in the fuel system 32. The hydrogen referenced in this disclosure is assumed to be in its gaseous phase. In this regard, the fuel system 32 may carry liquid cryogenic hydrogen or gaseous hydrogen, both of which are provided to the combustor section 26 as gaseous hydrogen. A challenge to using hydrogen is that because it is a gas, its handling and combustion properties differ from that of LHF. For instance, hydrogen does not require atomization like a liquid, and hydrogen has higher flammability and different flame characteristics than LHF. Accordingly, injector nozzles and combustors that are designed for hydrogen are needed. In these regards, the engine 20 includes a combustion system 38 that is configured for introducing the hydrogen fuel into combustor section 26.

Figure 2:
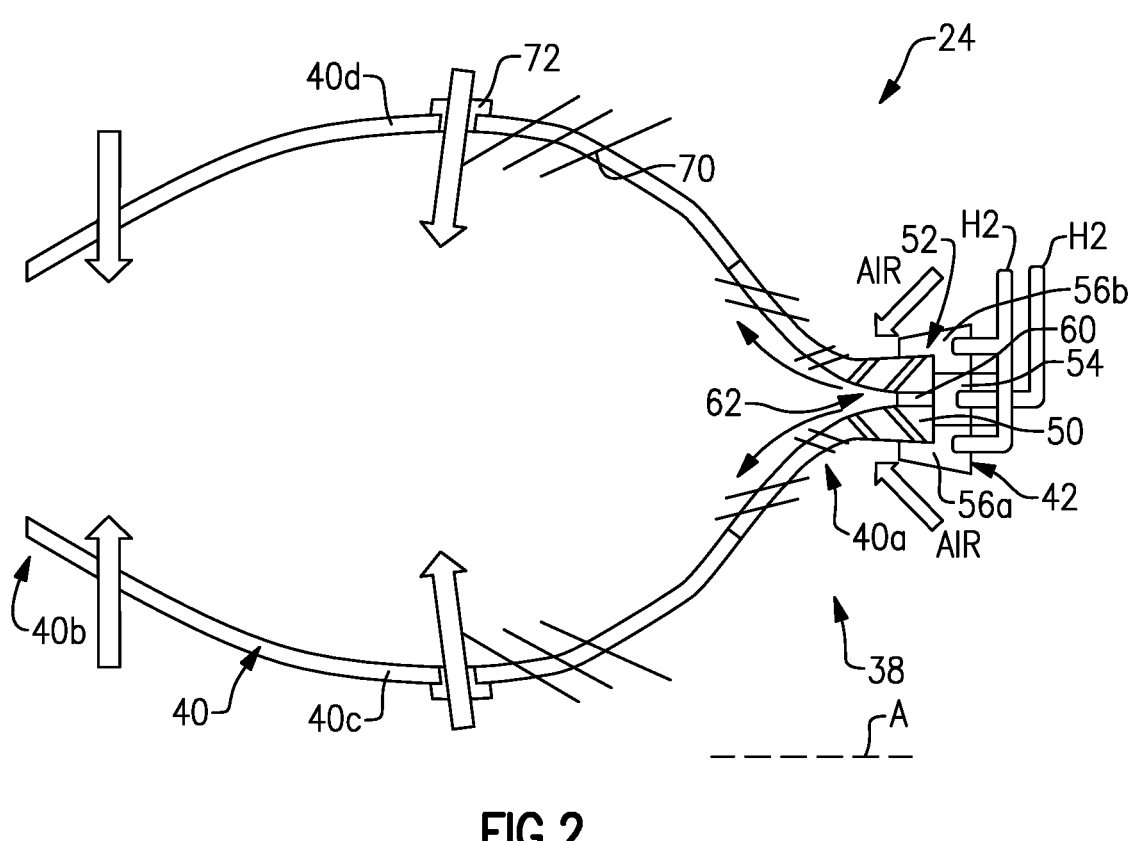
FIG. 2 illustrates the combustor section of the engine.

FIG. 2 shows a sectioned view of the combustion system 38 taken along a radial plane that includes the engine axis A (superimposed). The combustion system 38 includes a combustion chamber 40 in the combustor section 26 for introducing hydrogen and gas (e.g., air in the examples herein). The combustion chamber 40 is annularly disposed about the engine axis, i.e., chamber 40 is an annulus around the axis A. The combustion chamber 40 has first and second axial ends 40a/40b and radially inner and outer walls 40c/40d. Radially "inner" and "outer" as used herein indicate radial proximity to the engine axis A.

Figure 3:
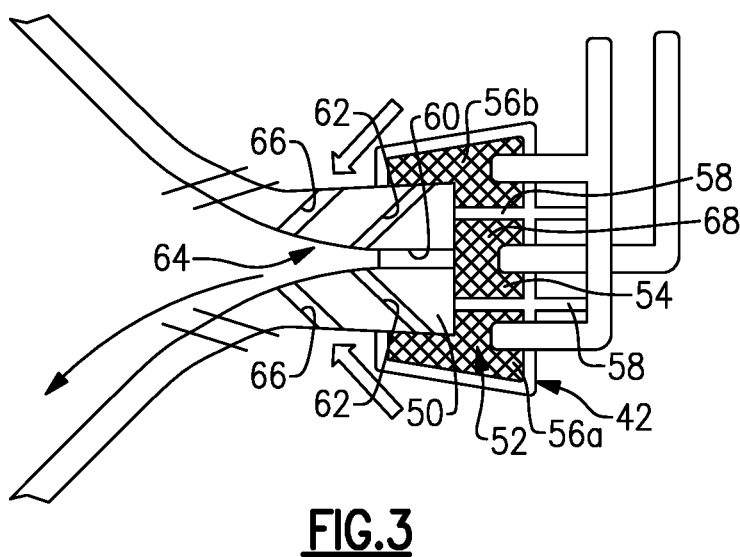
FIG. 3 illustrates an injector ring of the combustor section.

There is an injector ring 42 disposed about the engine axis A (e.g., co-axial with axis A) at the first axial end 40a that is connected to the fuel system 32 (hydrogen source) and the compressor section 24 for introducing a hydrogen and air mixture into the combustion chamber 40. As also shown in FIG. 3, the injector ring 42 includes an injector body 50 that defines a hydrogen manifold cavity 52. The hydrogen manifold cavity 52 is partitioned into a first isolated compartment 54 and a second isolated compartment (56a or 56b). In this example, there are two of the second isolated compartments 56a/56b, including a radially inner second isolated compartment 56a and a radially outer second isolated compartment 56b. The first isolated compartment 54 is radially between the second isolated compartments 56a/56b. Manifold walls 58 serve to divide and isolate the compartments 54/56a/56b such that hydrogen cannot flow between any of the compartments 54/56a/56b.

First hydrogen feed conduits 60 extend off of the first isolated compartment 54 of the hydrogen manifold cavity 52 and open into a mixing region 64. Second hydrogen feed conduits 62 extend off of the second isolated compartments 56a/56b and also open into the central mixing region 64. Forward of the second hydrogen feed conduits 62, the injector body 50 also defines gas feed conduits 66 that open into the central mixing region for providing air. A "conduit" as used herein is defined by one or more structures that together convey a fluid from one point to another. For example, a conduit conveying fluid from point A to point B may include one of, or a combination of: a tube, an aperture defined through a part of an engine, a filter, a pump, and so on, depending on the application and context as would be understood by a person of ordinary skill in the art reading the present disclosure.

In the illustrated example, the hydrogen manifold cavity 52 includes an open-cell metallic foam 68. For instance, the open-cell metallic foam 68 is formed of an alloy that has low susceptibility to hydrogen embrittlement, such as but not limited to, stainless steel or nickel alloy, and which is corrosion resistant and temperature resistant at the expected operating conditions. The foam 68 serves as a flame arrestor, allowing feed flow of hydrogen but facilitating the prevention of flame propagation back (flashback) through the injector ring 42. In general, flashback is prevented when the gas injection speed is higher than the local flame propagation speed.

Figure 4:
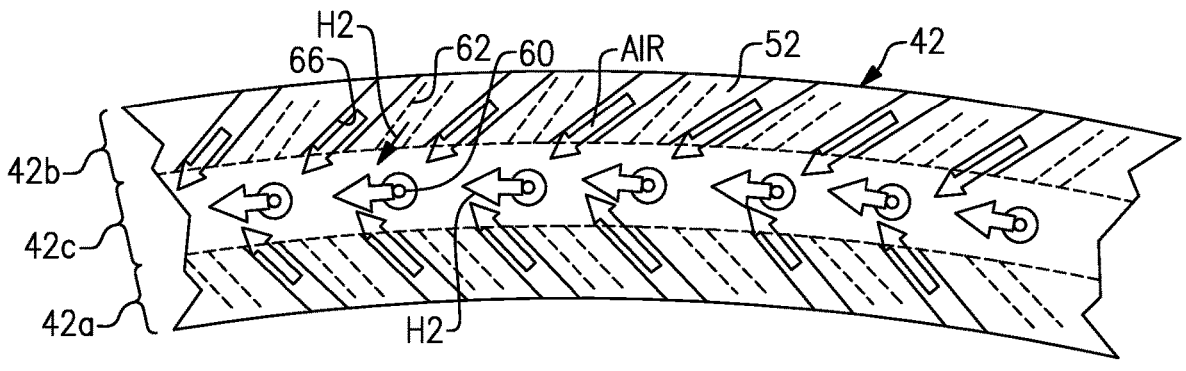
FIG. 4 illustrates an arc section of the injector ring.

FIG. 4 illustrates an axial view of a representative example arc section of the injector ring 42. The injector ring 42 includes radially inner and outer annular band sections 42a/42b and a radially intermediate annular band section 42c between the radially inner and outer annular band sections 42a/42b. The first hydrogen feed conduits 60 are within the intermediate annular band section 42c and are tangentially-sloped with respect to the engine axis A. The term "tangential slope" (or variation thereof) refers to an orientation that (a) forms an oblique angle with the engine axis A and (b) lies in a plane that is (i) non-intersecting with the engine axis A and (ii) is substantially tangent to the circumference at the radial location where the conduit 60 opens to the mixing region 64. For instance, a tangential slope is in either a clockwise or counter-clockwise direction with respect to the engine axis A (looking aft). For a conduit, the slope is taken with respect to the central axis of the conduit at the plane of its exit.

The radially inner and outer annular band sections 42a/42b include the second hydrogen feed conduits 62 and the gas feed conduits 66. In general, the size (at the conduit exits) of all of the first and second hydrogen feed conduits 60/62 are equivalent, and the size (at the conduit exit) of all of the gas feed conduits 66 are equivalent, although the sizes may differ between the hydrogen feed conduits 60/62 and the gas feed conduits 66. The gas feed conduits 66 and the second hydrogen feed conduits 62 are radially and tangentially sloped. The term "radial slope" (or variation thereof) refers to an orientation that has a radial angle component with respect to the engine axis A. For instance, a radial slope is either in a radially inwardly or outwardly direction with respect to the engine axis A (looking aft).

In the illustrated example, the second hydrogen feed conduits 62 in the radially inner annular band 42a and the gas feed conduits 66 in the radially inner annular band 42a are radially outwardly sloped, and the second hydrogen feed conduits 62 in the radially outer annular band 42b and the gas feed conduits 66 in the radially outer annular band 42b are radially inwardly sloped. Additionally, the second hydrogen feed conduits 60/62 and the gas feed conduits 66 are tangentially sloped in a common clockwise or common counter-clockwise direction (FIG. 4 is clockwise, as the figure view is axial looking forward).

The orientations of the feed conduits 60/62/66 facilitate good mixing of the hydrogen and air, as well as 3D circulation in the combustion chamber 40. For instance, the tangential slopes of the feed conduits 60/62/66 swirl the flows of hydrogen and air about the engine axis A. The radial slope of the gas feed conduits 66 directs flow of air across the face of the intermediate annular band section 42c, thereby facilitating mixing with the hydrogen from the first hydrogen feed conduits 60 and directing the mixture downstream into the combustion chamber 40.

The combustion chamber 40 (FIG. 2) may also include cooling jets 70 for introducing additional gas for combustion and cooling the walls of the chamber 40, as well as downstream dilution jets 72 for further controlling stability and radial flame profile. The dilution jets 72 may also be tangentially-sloped for further swirling effect. As an example, the dilution jets 72 are tangentially sloped in the opposite direction (clockwise or counter-clockwise) of the tangential slopes of the feed conduits 60/62/66. Such a configuration facilitates producing a counter-swirl to the bulk of the flow in the combustion chamber 40 from the injector ring 42, for more rapid uniform circumferential mixing. For example, in a rich-burn configuration of the combustion system, the injector ring 42 may introduce approximately 15% to 25% of the air for combustion into the combustion chamber 40, and the remainder of the air may be provided by the cooling jets 70 and dilution jets 72.

This combustion chamber 40 may also work for lean-burn combustion system. For example, approximately 60% to 80% of the combustion air can be introduced through the feed conduits 60/62/66 into the combustion chamber 40. The remainder of the air can be used for the combustor exit temperature profile trimming through the profile trimming jets 74 downstream of the dilution jets 72.

The combustion system 38 is configured for fuel staging. For instance, the first isolated compartment 54 and the first hydrogen feed conduits 60 serve as a primary hydrogen feed, and the second isolated compartments 56a/56b and second hydrogen feed conduits 62 serve as secondary hydrogen feed. Fuel staging permits the amount of hydrogen supplied for combustion to be varied. For example, a first percentage of the hydrogen is provided into the combustion chamber 40 via the first hydrogen feed passages 60, and a second percentage of the hydrogen is provided into the combustion chamber 40 by the second hydrogen feed conduits 62. This permits the percentages to be modulated in order to achieve different combustion performance, such as engine starting, control of power output, widening of the flame stability envelope, and thermoacoustic stability. The stoichiometric ratios of the hydrogen and air in the mixtures may also be adjusted for further control over engine performance. For example, an engine controller may control the percentage and ratios in accordance with a control schedule, such as a lookup table. The fuel system 32 may include valves, flow meters, and other known flow control devices that are configured to be operated by the controller in response to the control schedule to control flow of hydrogen and air.

This disclosure may be further understood in view of the following examples. A turbine engine 20 according to an example of the present disclosure includes an annular combustion chamber 40 disposed about an axis A and having first and second axial ends 40a/40b and radially inner and outer walls 40c/40d. There is an injector ring 42 disposed about the axis A at the first axial end 40a that is configured to introduce a hydrogen and gas mixture into the combustion chamber 40. The injector ring includes gas feed conduits 66 that into a central mixing region 64, a hydrogen manifold cavity 52 that has first and second isolated compartments 54/56(*a* or *b*), first hydrogen feed conduits 60 that extend off of the first isolated compartment 54 and open into the central mixing region 64, and second hydrogen feed conduits 62 that extend off of the second isolated compartment 56 and open into the central mixing region 64.

In a further example of the foregoing example, the first hydrogen feed conduits 60 are tangentially-sloped.

In a further example of any of the foregoing examples, the second hydrogen feed conduits 62 are radially and tangentially sloped.

In a further example of any of the foregoing examples, the gas feed conduits 66 are radially and tangentially sloped.

In a further example of any of the foregoing examples, the injector ring 42 includes radially inner and outer annular band sections 42a/42b, a radially intermediate annular band section 42c between the radially inner annular band section 42a and the radially outer annular band section 42b, and the first hydrogen feed conduits 60 are within the intermediate annular band section 42c.

In a further example of any of the foregoing examples, the radially inner and outer annular band sections 42a/42b include the second hydrogen feed conduits 62.

In a further example of any of the foregoing examples, the radially inner and outer annular band sections 42a/42b include the gas feed conduits 66.

In a further example of any of the foregoing examples, the gas feed conduits 66 in the radially inner annular band 42a are radially outwardly sloped, and the gas feed conduits 66 in the radially outer annular band 42b are radially inwardly sloped.

In a further example of any of the foregoing examples, the gas feed conduits 66 and the first and second hydrogen feed conduits 60/62 are tangentially sloped in a common clockwise or common counter-clockwise direction.

In a further example of any of the foregoing examples, the hydrogen manifold cavity 52 includes an open-cell metallic foam 68.

In a further example of any of the foregoing examples, the hydrogen manifold cavity 52 has two of the second isolated compartments 56a/56b, including a radially inner second isolated compartment 56a and a radially outer second isolated compartment 56b.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
an annular combustion chamber disposed about an axis and having a first axial end and a second axial end and a radially inner wall and a radially outer wall, there being an axially forward direction from the first axial end toward the second axial end and an opposite, axially aft direction; and an injector ring disposed about the axis at the first axial end and configured to introduce a hydrogen and gas mixture into the annular combustion chamber, the injector ring including gas feed conduits opening at a first axial location into a central mixing region, a hydrogen manifold cavity having a first isolated compartment and a second isolated compartment, first hydrogen feed conduits extending off of the first isolated compartment and opening at a second axial location into the central mixing region, second hydrogen feed conduits extending off of the second isolated compartment and opening at a third axial location into the central mixing region, and the second axial location and the third axial location are each axially aft of the first axial location, a radially inner annular band section, a radially outer annular band section, and a radially intermediate annular band section between the radially inner annular band section and the radially outer annular band section, the first hydrogen feed conduits are within the radially intermediate annular band section, the radially inner annular band section and the radially outer annular band section include the second hydrogen feed conduits, the radially inner annular band section and the radially outer annular band section include the gas feed conduits, the gas feed conduits in the radially inner annular band are radially outwardly sloped, the gas feed conduits in the radially outer annular band are radially inwardly sloped, and the gas feed conduits, the first hydrogen feed conduits, and the second hydrogen feed conduits are tangentially sloped in a common clockwise or common counter-clockwise direction.

2. The gas turbine engine as recited in claim 1, wherein the second hydrogen feed conduits are radially and tangentially sloped.

3. The gas turbine engine as recited in claim 2, wherein the gas feed conduits are radially and tangentially sloped.

4. The gas turbine engine as recited in claim 1, wherein the hydrogen manifold cavity includes an open-cell metallic foam.

5. The gas turbine engine as recited in claim 4, wherein the hydrogen manifold cavity has two of the second isolated compartments, including a radially inner second isolated compartment and a radially outer second isolated compartment.

6. The gas turbine engine as recited in claim 1, wherein the gas feed conduits include gas feed conduit exits at the central mixing region, the first hydrogen feed conduits and the second hydrogen feed conduits include hydrogen feed conduit exits at the central mixing region, and the gas feed conduit exits are equivalent in size and the hydrogen feed conduit exits are equivalent in size.

7. A gas turbine engine comprising:
a combustor section having a combustion chamber disposed about an axis and having a first axial end and a second axial end and a radially inner wall and a radially outer wall;
a hydrogen source; and an injector ring disposed about the axis at the first axial end and configured to introduce a hydrogen and gas mixture into the combustion chamber, the injector ring including gas feed conduits that open into a central mixing region, and relative to the axis the gas feed conduits are radially and tangentially sloped, a hydrogen manifold cavity having a first isolated compartment and a second isolated compartment, an open-cell metallic foam disposed in the hydrogen manifold cavity, first hydrogen feed conduits extending off of the first isolated compartment and opening into the central mixing region, the first hydrogen feed conduits being tangentially-sloped, second hydrogen feed conduits extending off of the second isolated compartment and opening into the central mixing region, the second hydrogen feed conduits being radially and tangentially sloped, a radially inner annular band section, a radially outer annular band section, a radially intermediate annular band section between the radially inner annular band section and the radially outer annular band section, the first hydrogen feed conduits are within the radially intermediate annular band section, the radially inner annular band section and the radially outer annular band section include the gas feed conduits, the radially inner annular band section and the radially outer annular band section include the second hydrogen feed conduits, the gas feed conduits in the radially inner annular band are radially outwardly sloped, the gas feed conduits in the radially outer annular band are radially inwardly sloped, and the gas feed conduits, the first hydrogen feed conduits, and the second hydrogen feed conduits are tangentially sloped in a common clockwise or common counter-clockwise direction.

* * * * *